(12) United States Patent
Zhang

(10) Patent No.: US 9,936,390 B2
(45) Date of Patent: *Apr. 3, 2018

(54) METHOD AND APPARATUS OF TRIGGERING APPLICATIONS IN A WIRELESS ENVIRONMENT

(71) Applicant: Beijing Nanbao Technology Co. Ltd., Beijing (CN)

(72) Inventor: Zhaolong Zhang, Beijing (CN)

(73) Assignee: Beijing Nanbao Technology Co., Ltd., Beijing (CN)

( * ) Notice: Subject to any disclaimer, the term of this patent is extended or adjusted under 35 U.S.C. 154(b) by 2 days.

This patent is subject to a terminal disclaimer.

(21) Appl. No.: 15/683,954

(22) Filed: Aug. 23, 2017

(65) Prior Publication Data

US 2017/0353860 A1  Dec. 7, 2017

Related U.S. Application Data

(63) Continuation of application No. 14/946,352, filed on Nov. 19, 2015.

(51) Int. Cl.
*H04L 29/06* (2006.01)
*H04W 12/08* (2009.01)
(Continued)

(52) U.S. Cl.
CPC ............ *H04W 12/08* (2013.01); *H04L 63/08* (2013.01); *H04L 63/10* (2013.01); *H04L 63/102* (2013.01);
(Continued)

(58) Field of Classification Search
CPC ...... H04W 12/06; H04W 12/08; H04W 48/02; H04W 48/16; H04W 63/08; H04W 63/10; H04W 63/102; H04W 67/306
See application file for complete search history.

(56) References Cited

U.S. PATENT DOCUMENTS 7,158,776 B1 * 1/2007 Estes ................. H04L 63/02
                                                         380/247
7,656,840 B2   2/2010 Krishnamurthi et al.
(Continued)

FOREIGN PATENT DOCUMENTS

CN        102917023 A     2/2013
CN        202931390 U     5/2013
(Continued)

*Primary Examiner* — Khoi Le
(74) *Attorney, Agent, or Firm* — Young Basile Hanlon & MacFarlane, P.C.

(57) ABSTRACT

Receive a first device identifier from a first computing device; determine whether the first device identifier matches the second device identifier stored in a database at the second computing device; locate first user data associated with the first device identifier in the database of the second computing device based on a match; transmit the first user data to the first computing device based on a location of the first user data associated with the first device identifier; select an application to automatically launch on the first computing device based on application information within the first user data; update a user data list with the first user data, wherein the user data list is associated with the application and is stored at the second computing device; and launch the application on the first computing device, wherein the application uses second user data determined from the user data list.

20 Claims, 3 Drawing Sheets

(51) Int. Cl.
  *H04W 12/06* (2009.01)
  *H04W 48/02* (2009.01)
  *H04L 29/08* (2006.01)
  *H04W 48/16* (2009.01)
(52) U.S. Cl.
  CPC ........... *H04L 67/306* (2013.01); *H04W 12/06* (2013.01); *H04W 48/02* (2013.01); *H04W 48/16* (2013.01)

(56) References Cited

U.S. PATENT DOCUMENTS

| | | |
|---|---|---|
| 8,392,712 B1 | 3/2013 | Wilson |
| 2004/0005888 A1 | 1/2004 | Taketsugu |
| 2006/0046709 A1 | 3/2006 | Krumm et al. |
| 2008/0076386 A1 | 3/2008 | Khetawat et al. |
| 2008/0172341 A1* | 7/2008 | Crandell ............... G06F 21/31 705/75 |
| 2009/0033515 A1 | 2/2009 | Cavanaugh |
| 2009/0161555 A1 | 6/2009 | Chung |
| 2009/0275348 A1 | 11/2009 | Weinreich et al. |
| 2011/0076941 A1* | 3/2011 | Taveau ................... G06Q 10/10 455/41.1 |
| 2012/0166571 A1 | 6/2012 | Jin |
| 2012/0215931 A1 | 8/2012 | Touati et al. |
| 2012/0254615 A1 | 10/2012 | Ma et al. |
| 2013/0067081 A1* | 3/2013 | Liu ....................... H04W 12/06 709/225 |
| 2013/0173743 A1 | 7/2013 | Grigg et al. |
| 2013/0273960 A1 | 10/2013 | Zhang et al. |
| 2014/0036703 A1 | 2/2014 | Ding et al. |
| 2016/0154390 A1 | 6/2016 | Zhang et al. |

FOREIGN PATENT DOCUMENTS

| | | |
|---|---|---|
| CN | 103927257 A | 7/2014 |
| CN | 104053191 A | 9/2014 |

* cited by examiner

METHOD AND APPARATUS OF TRIGGERING APPLICATIONS IN A WIRELESS ENVIRONMENT

CROSS-REFERENCE TO RELATED APPLICATION(S)

The present application is a continuation of U.S. patent application Ser. No. 14/946,352 filed on Nov. 19, 2015, the content of which is hereby incorporated by reference in its entirety.

TECHNICAL FIELD

The present disclosure generally relates to the field of wireless communication and mobile operating system, and in particular, to triggering applications in a wireless environment.

BACKGROUND

As mobile communication systems and smart mobile devices are more and more used in daily life, security and convenience for wireless data communication service demand higher standards. Traditional data communication services meet the security standard by authenticating user login via active actions of a user, which inevitably compromising the convenience; however, many recent successful products introduce more advanced authentication methods, such as combined identification based on at least one of: fingerprints, lip lines, iris, or heart rates. These advanced methods can be implemented to reduce complexity and tediousness of multistep, password-based authentication for the user, on the cost of higher complexity of software and hardware.

SUMMARY

Aspects of the present disclosure include methods, apparatuses and systems for authorizing a mobile device to access a wireless network and triggering applications of data communication services in a wireless environment.

In one aspect, the present disclosure includes a method comprising receiving, by a processor, a first device identifier from a first computing device; determining, by the processor, whether the first device identifier matches a second device identifier stored in a database at the second computing device, wherein the database stores a set of device identifiers, a set of user data, and corresponding relationships between the set of device identifiers and the set of user data; locating, by the processor, first user data associated with the first device identifier in the database of the second computing device based on the determination that the first device identifier matches the second device identifier stored in the database; transmitting, by the processor, the first user data to the first computing device based on a location of the first user data associated with the first device identifier in the database of the second computing device; selecting, by the processor, an application to automatically launch on the first computing device based on application information within the first user data and based on whether the first computing device has a stable power supply; updating, by the processor, a user data list with the first user data, wherein the user data list is associated with the application and is stored at the second computing device; determining, by the processor, second user data from the user data list; and launching, by the processor, the application on the first computing device, wherein the application uses the second user data.

In another aspect, the present disclosure includes a method comprising receiving, by a processor, a first device identifier from a first computing device in response to a determination that a distance between the first computing device and a second computing device is within a predetermined range distance for a predetermined time period; determining, by the processor, whether the first device identifier matches the second device identifier stored in a database at the second computing device, wherein the database stores a set of device identifiers, a set of user data, and corresponding relationships between the set of device identifiers and the set of user data; locating, by the processor, first user data associated with the first device identifier in the database of the second computing device based on the determination that the first device identifier matches the second device identifier stored in the database; transmitting, by the processor, the first user data to the first computing device based on a location of the first user data associated with the first device identifier in the database of the second computing device; selecting, by the processor, an application to automatically launch on the first computing device based on application information within the first user data; updating, by the processor, a user data list with the first user data, wherein the user data list is associated with the application and is stored at the second computing device; determining, by the processor, second user data from the user data list; and launching, by the processor, the application on the first computing device, wherein the application uses the second user data.

In another aspect, the present disclosure includes an apparatus comprising a memory and a processor, wherein the processor is configured to execute instructions stored in the memory to receive a first device identifier from a first computing device; determine whether the first device identifier matches the second device identifier stored in a database at the second computing device, wherein the database stores a set of device identifiers, a set of user data, and corresponding relationships between the set of device identifiers and the set of user data; locate first user data associated with the first device identifier in the database of the second computing device based on the determination that the first device identifier matches the second device identifier stored in the database; transmit the first user data to the first computing device based on a location of the first user data associated with the first device identifier in the database of the second computing device; select an application to automatically launch on the first computing device based on application information within the first user data; update a user data list with the first user data, wherein the user data list is associated with the application and is stored at the second computing device; determine second user data from the user data list; and launch the application on the first computing device, wherein the application uses the second user data.

Features and advantages of the present disclosure will be set forth in the descriptions thereof that follow, or will be apparent from or by practice of the disclosure.

BRIEF DESCRIPTION OF THE DRAWINGS

The description here refers to the accompanying drawings where like reference numerals refer to like parts throughout the several views.

DETAILED DESCRIPTION

Example implementations of the present disclosure will be described below with reference to the accompanying drawings. The same numbers across the drawings set forth in the following description represent the same or similar elements, unless differently expressed. The implementations set forth in the following description do not represent all implementations or embodiments consistent with the present disclosure; on the contrary, they are only examples of apparatuses and methods in accordance with some aspects of this disclosure as detailed in the claims.

In this disclosure, actions of moving a mobile device to a wireless router (i.e., "proximity") include actions of, including but not limited to, placing the mobile device within a predetermined range of the wireless router, moving the mobile device around the router within the predetermined range, moving the mobile device towards the router until within the predetermined range, or combination thereof. In addition, the above-mentioned one or more actions may be combined with one or more other events. For example, the mobile device (i.e., "mobile terminal") may have a software or hardware button, wherein the action of moving the mobile device to a wireless router is combined with an event of pressing the button, which is alternatively called "kissing". The time difference between the moving and the pressing is used to determine proximity between the mobile device and the router.

In some scenarios, the methods described herein is applicable to trigger events such as conducting services of register, check-in, and payment in locations of hotels, airports, shops, or public transportation. For example, when an employee is checking in or out of the office, and his or her mobile device is approaching the employer's router, mobile information pre-stored in the mobile device can be triggered to be sent to the employer via proximate high-speed encrypted data transmission, which allows the employer to do application-based secondary authentication to improve data security and greatly reduce time for manual check.

In the following examples, the wireless router is assumed to be properly configured and connected to the Internet.

Figure 1:
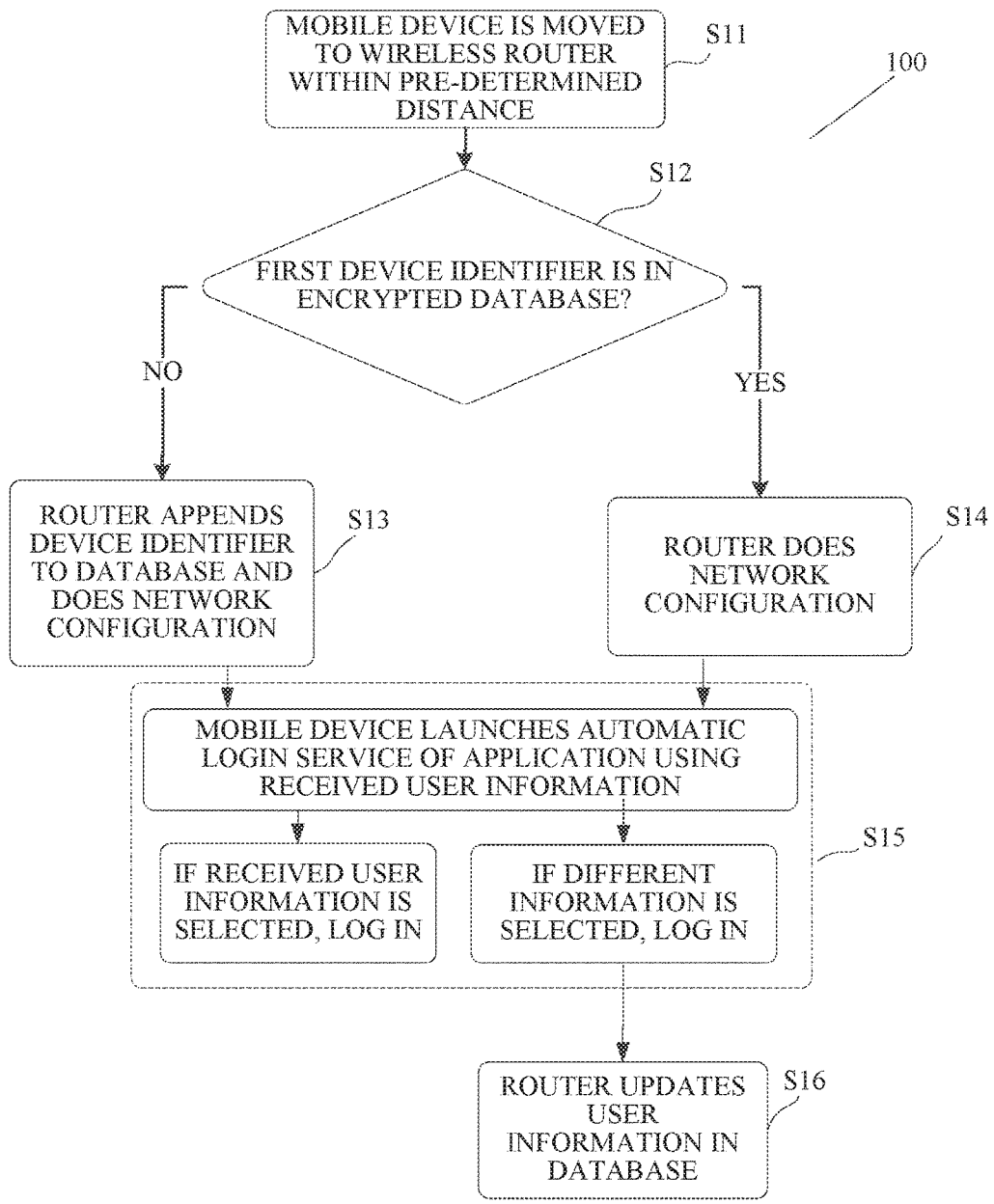
FIG. 1 is a flowchart of a method for authorizing a mobile device to access a wireless network and triggering an application in the mobile device according to implementations in this disclosure.

FIG. 1 is a flowchart of a method for authorizing a mobile device to access a wireless network and triggering an application in the mobile device.

At operation S11, a mobile device such as a mobile phone is moved to a wireless router within a predetermined range, wherein the wireless router is able to detect presence of the mobile device. The detection may be embodied by a proximity sensor equipped in the wireless router. Upon detecting the presence of the mobile device, the router establishes a connection between the mobile device and itself.

In one implementation, the pre-determined range may be determined using strength of a wireless signal received from the mobile device by the router, in accordance with a model of a relation between the range and the signal strength. For example, the router may measure a distance or a position of the mobile device using a radiofrequency (RF) signal received from the mobile device. The model may be preconfigured and stored in the router, or downloaded from a server and dynamically adjusted via a network. Alternatively, the predetermined range may be determined using the signal strength combined with one or more parameters, such as a transmission rate and a loss rate, in accordance with a model of a relation between the range and the signal strength, the transmission rate, and the loss rate.

In another implementation, the pre-determined range may be determined using location information of the mobile device received from the mobile device by the router or a wireless network device, such as a cloud server, an accessory distance measurement apparatus equipped in a wireless router, or another mobile device of the same type. The location information may be geological information such as, a location of the mobile device, a distance between the mobile device and the wireless network device, and tracking information of the mobile device recording a trace thereof. Further, the location information may also be temporal information, or a combination of the geological information and the temporal information such as the mobile device being within a distance of 5 cm from the wireless router for longer than 3 seconds, wherein a geological and temporal model is used to determine the distance and the duration. Alternatively, the above-mentioned location information may be provided by the mobile device or a third party to the router.

At operations S12-S14, the router authorizing the mobile device to access a wireless network associated with the router using a first device identifier of the mobile device. A traditional method to authenticate a user for communication services and resources is to indicate the user to enter a username and a password. According to this implementation, the device identifier received from the mobile device, or the first device identifier, is used to authorize the mobile device to access the wireless network, wherein the first device identifier includes at least one item in the following device information list: an IP address, a MAC address, a mobile phone number, a manufacturer logo, a time stamp, a mobile device number such as a serial number or an International Mobile Station Equipment Identity (IMEI), and/or any device information that is unique to the mobile device. This method is based on an assumption that the user of the mobile device near the wireless router is trusted, which is set forth in the following description.

At operation S12, the router receives the first device identifier from the mobile device and determines whether the first device identifier is stored in data storage, such a database, wherein the database may store a set of device identifiers, a set of user information and corresponding relationships between the set of device identifiers and the set of user information. The database may be stored in the router or in another device accessible to the router, wherein the database is encrypted for security of information of the mobile device and the user.

At operation S13, if the first device identifier is not stored in the database, the router encrypts and appends the first device identifier to the encrypted database, and configures the mobile device for access to the wireless network. This case indicates that the mobile device is connected to the router for the first time, wherein the router encrypts the device identifier, appends or overwrites the device identifier to the database and performs necessary network configurations in the mobile device, wherein in accordance with an automatic configuration of the router or a request by the mobile device, the router determines parameters for the mobile device for access to the wireless network based upon network configuration information, wherein the network configuration information includes at least one of: a MAC address, an IP address, a channel measurement, power information, and battery information. Once properly configured, the mobile device sends a request to the router for access to the wireless network, such as the Internet, which is then granted by the wireless router upon receiving the request.

At operation S14, if the first device identifier is stored in the database, the router configures the mobile device for access to the wireless network. This case indicates that the mobile device was connected to the wireless router, wherein the router performs the same network configuration to the mobile device as described in operation S13.

In one implementation, flowchart 100 may further include an operation of authorizing the mobile device to access the wireless network based on a predetermined model, wherein the model includes a corresponding relation between location information of the mobile device and network access information.

In one implementation, flowchart 100 may further include an operation of a second verification process, which determines whether the mobile device and a user associated with the mobile device have secure identity information using information such as a username, a password, a fingerprint, iris information, a sound wave, a two-dimensional code or a dynamic password.

In one implementation, flowchart 100 may further include an operation of sending the location information of the mobile device, the model and the device identifier of the mobile device to a cloud server connected via a network, wherein the cloud server adjusts or revises the model based on conditions of user behavior, user need and application need, and sends back the adjusted model to the router and associated applications, thereby authorizing the mobile device in accordance with the conditions for adjustment or revision.

At operation S15, the router launches a data communication application on the mobile device, including the following sub-operations.

First, the router locates first user information (block 23 in FIG. 2) associated with the first device identifier in the encrypted database of the router, wherein the first user information comprises a username and a password.

Second, the router sends the first user information back to the mobile device, which may be used for an automatic login service of the application.

Then the mobile device incorporates the first user information into a user information list and launches the automatic login service of the application, wherein the user information list is associated with the application and stored at the mobile device. For example, recent applications support a function of caching, which stores most recently used usernames and passwords for the application. The mobile device may combine the cached user information and the first user information received from the router to update the cached user information list.

If the user information list as a result of the above-mentioned steps contains only one item, which is essentially the first user information, the mobile device automatically select the item for the automatic login service of the application.

If otherwise, the mobile device indicates a list for user selection, wherein the list includes items in the user information list and an option item for entering third user information. Once the user selects or enters new user information that is different from the first user information, the mobile device uses the new user information for the automatic login service of the application. If this sub-operation is executed, operation S16 follows as the final operation of this method.

At Operation S16, the mobile device sends the new user information to the router, wherein the router updates the database with the received user information for the application launched on the mobile device, such as a social network application, a document uploading application, a cloud drive application or any other application that can be used.

In one implementation, at operation S15-S16, if the mobile device has high speed network and stable power supply, such as being placed near the router with a charger plugged in, the application may further be one of the following: an application for configuring the mobile device, an application for service of documents, pictures, audio or video, an application for location based services of weather, news or social networking, and an application for backing up data to a cloud server.

In one implementation, if the user has high demand for network speed, the router may firstly backup the data to the local storage medium installed in the wireless router, and secondly upload the data to the cloud server when the user has low demand for network speed, such as in night time.

In some implementations, the authorization may be completed between more than one router via a mobile device, the operations of which are set forth in the following description.

First, a first wireless router is configured in accordance to a configuration described in connection with FIG. 1, and the mobile device is authorized via the operations set forth in the aforementioned implementation.

Then, a second wireless router at a different location with no wired network connection is switched on, wherein the second wireless router automatically enters a repeater work mode to work as a wireless network repeater based on a determination that the second wireless router has no wired network connection.

The mobile device, or any device that has been previously authorized by the first wireless router, is moved towards the second wireless router (e.g., "kissing"), wherein the second wireless router establishes a wireless connection with the mobile device and authenticates the mobile device via the operations set forth in the aforementioned implementation.

Upon the mobile device, or any device that has been previously authorized by the first wireless router, being authenticated by the second wireless router, the second wireless router sends out a network connection request to one or more routers in near location thereof, wherein the request contains a device identifier (can be unique) of the mobile device. The format of the request is specialized so that only a wireless router of the same kind with the same ability of authorization is able to parse the request.

Upon the first wireless router receiving and parsing the request sent by the second wireless router, the first wireless router determines that whether the device identifier is within an encrypted database stored within the same, wherein the encrypted database maintains a list of device identifier which associates to devices that have been previously authorized by the first wireless router.

Upon a determination that the received device identifier is within the encrypted database of the first wireless router, the first wireless router authorizes the network connection request sent by the second wireless router, so that the two wireless routers establish a wireless network connection.

The second wireless router receives network configuration information comprising a network name, a network password and an IP address range from the first wireless router, and configures itself in accordance to the network configuration information, wherein the network configuration information is used by the first wireless router to connect to a broad wireless network, such as the Internet.

Finally, the second wireless router disables a Dynamic Host Configuration Protocol (DHCP) program on the same, wherein the DHCP program automatically allocates IP addresses, and switches the work mode thereof from the repeater mode to a bridge mode, and the second wireless router uses the first wireless router as a DHCP server.

In these implementations, the second wireless router establishes a connection to the broad wireless network without any manual configuration, whereby coverage of the broad wireless network is enlarged, and the mobile device is able to seamlessly roam within the coverage of both wireless routers.

Figure 2:
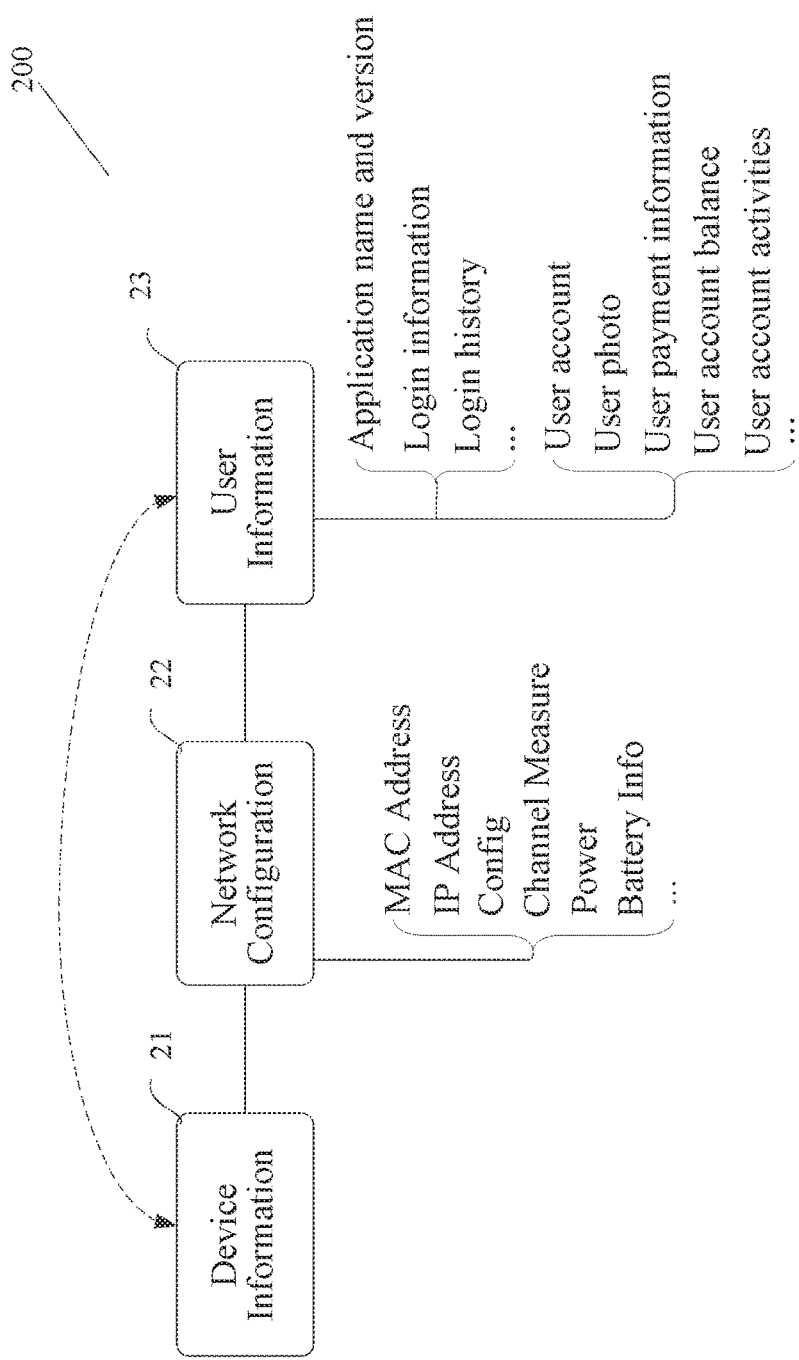
FIG. 2 is a block diagram of mobile device information, network configuration, user information and relationship in between according to implementations in this disclosure.

FIG. 2 illustrates the data structures and relationship thereof between a device identifier (e.g., the device information), network configuration information, and user information associated with applications according to implementations herein.

The device identifier, illustrated in block 21, is stored in a mobile device, which is sent to a wireless router for authorization. In one implementation, device information 21 can be stored in a format of a table or a database. Device information 21 has a unique and immutable association relation to user information 23 stored in the router.

Network configuration information 22 is stored in the router for configuring the connected mobile device by automatic allocation or a request sent by the mobile device. The network configuration information includes at least one of: a MAC address, an IP address, a channel measurement, power information, or battery information.

User information 23 includes information related to applications and account information related to a user. The information related to the applications include at least one of: a username, a password, a name of the application, a version number of the application, a recent login time stamp associated with the username and the password, and a recent logout time stamp associated with the username and the password. The account information related to a user includes at least one of: a user account number, user identity information, a user photo, user payment information, a user account balance, a time stamp of a recent transaction, and a location of a recent transaction.

In one implementation, network configuration information 22 and user information 23 may be implemented as a component of a complex database.

The data structures and relationships thereof illustrated in FIG. 2 may be modified and/or extended based on different software and/or hardware environment, wherein the methods described herein may be modified accordingly in accordance with such modification and/or extension.

Figure 3:
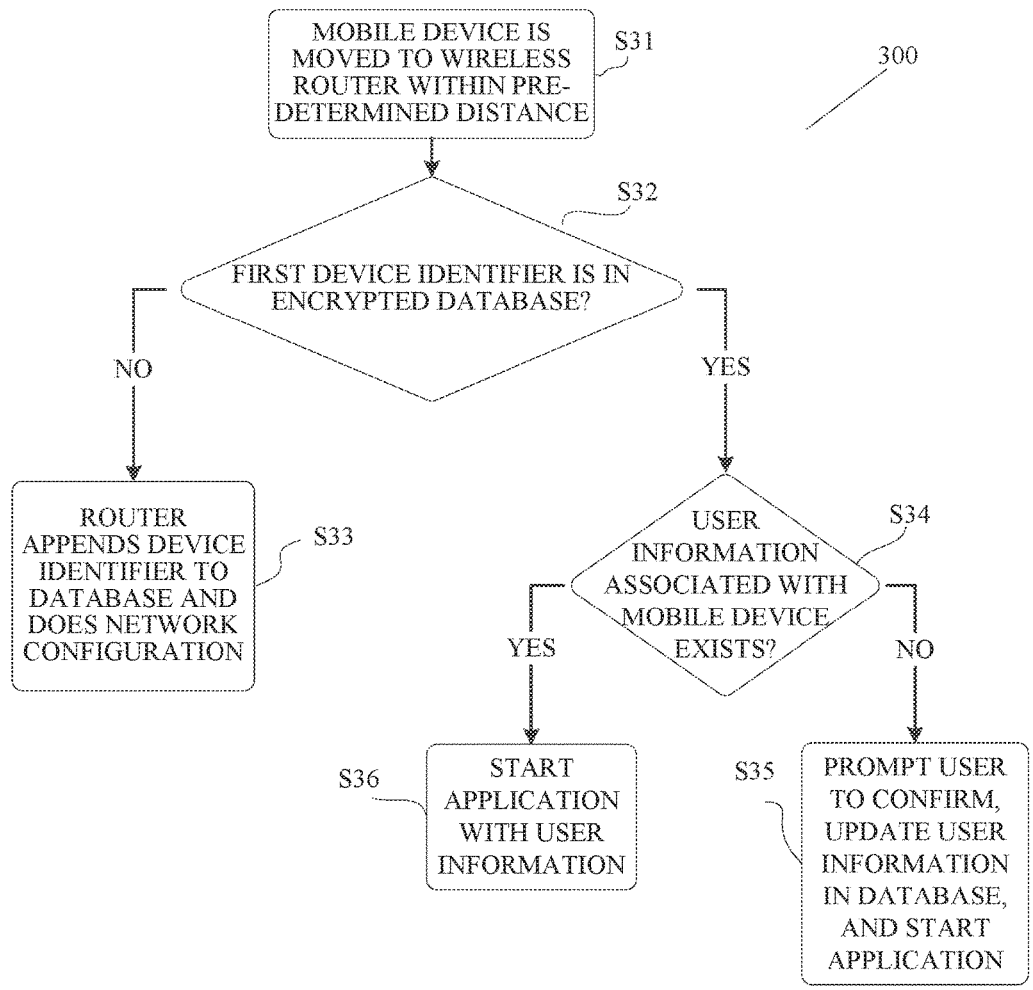
FIG. 3 is a flowchart of a method of transmitting user information from a mobile device to a wireless router according to implementations in this disclosure.

FIG. 3 is a flowchart of a method of transmitting user information from a mobile device to a wireless router, wherein operations of S31, S32 and S33 are the same as S11, S12 and S13, respectively.

At operations S34-S36, the router receives first user information of an application from the mobile device to update an encrypted database at the router, and launches the application using the first user information.

At operation S34, the router receives pre-stored user information, structured as block 23, from the mobile device to determine whether second user information associated with the first device identifier exists in the encrypted database, wherein the first device identifier is the device identifier of the mobile device used in operations S31-S33.

At operation S35, the router determines the second user information does not exist in the database. This case indicates that the device is connected to the router for the first time. The router then further determines whether the first user information is identical to third user information associated with a second device identifier stored in the encrypted database. If the first user information is identical to the third user information, the mobile device indicates the user to confirm association between the first device identifier and the third user information, replaces the second device identifier in the encrypted database with the first device identifier, and starts the application using the third user information. This case indicates that a user selects previously used user information with a first-time connected mobile device. If the first user information is different from any user information stored in the database, the mobile device indicates the user to confirm association between the first device identifier and the first user information, appends the first user information to the encrypted database, and starts the application with the first user information. This case indicates that neither the user information nor the mobile device was used in this router.

At operation S36, the router determines the second user information exists in the database. If the second user information is identical to the first user information, the mobile device starts the application using the first user information. This case indicates same user information is selected in a previously connected mobile device. If the second user information is different from the first user information, the mobile device indicates the user to confirm association between the first device identifier and the first user information, replaces the second user information in the encrypted database with the first user information, then start the application using the first user information. This case indicates that different user information is selected in a previously connected mobile device.

In one implementation, a manual operation is needed to compare sensitive user information, such as a user photo, with any user information pre-stored in the encrypted database. Upon a successful comparison, with the user's confirmation, the router updates the user information. The mobile device user may proceed to use the applications. For example, upon a successful comparison, the mobile device may proceed in an application to complete a business transaction using stored payment information. The user information may be updated simultaneously at the router and the mobile device.

It should be understood that each block or flow in the flowcharts may be realized by computer program instructions. Unless otherwise specified, any or all parts of the examples discussed above can be combined. The order of the implementations can be changed or substituted by equivalents and multiple operations can be combined into one or vice versa. The embodiments of the present disclosure can be implemented by computer software, hardware, firmware, logic circuits (like ASIC), or their combinations. In some examples, part of the functions of the wireless router of the mobile device can be implemented by cloud servers, and part of the data, such as user information, can also be stored or backed up in cloud servers.

In some implementations, the wireless router (and the algorithms, methods, and instructions stored thereon and/or executed thereby) can be realized in hardware including intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. Further, portions of the mobile device and the wireless router do not necessarily have to be implemented in the same manner.

In some implementations, the wireless router can be implemented using general purpose computers/processors with a computer program that, when executed, carries out any of the respective methods, algorithms and/or instructions described herein. In addition or alternatively, special purpose computers/processors are utilized that contain specialized hardware for carrying out any of the methods, algorithms, or instructions described herein.

Further, all or a portion of implementations can take the form of a computer program product accessible from, for example, a non-transitory computer-usable or computer-readable medium. In an implementation, a non-transitory computer-usable or computer-readable medium can be any device that can tangibly contain, store, communicate, or transport the program for use by or in connection with any processor. The non-transitory medium can be an electronic device, magnetic device, optical device, electromagnetic device, or a semiconductor device. Other suitable mediums are also available.

While this disclosure includes what is presently considered to be the most practical and preferred embodiments or implementations, it is to be understood that the disclosure is not to be limited to the disclosed embodiments or implementations but is intended to cover various modifications and equivalent arrangements included within the spirit and scope of the claims, which scope is to be accorded the broadest interpretation so as to encompass all such modifications and equivalents (such as equivalent structures) as are permitted under the law.

It should be understood to those of ordinary skills in the art that the implementations of the present disclosure may be presented as methods, apparatus, systems or computer program products. Accordingly, the present disclosure may take the form of an entirely hardware implementation, an entirely software implementation, or an implementation combining hardware and software. Moreover, the present disclosure may take the form of a computer program product which may be implemented on one or more computer usable storage media in which computer usable program code is contained.

The above-described implementations have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

The mobile device may be a computing device, which includes one or more hardware including at least a processor such as a central processing unit (CPU) and a memory for data storage. The CPU may include a controller for controlling operations of the computing device, or may be a microprocessor, digital signal processor, field programmable gate array, discrete circuit elements laid out in a custom application specific integrated circuit (ASIC), or any other digital data processor. The CPU may be connected to the memory by a memory bus, one or more wires, one or more cables, a wireless connection, or any other connection. The memory may be a read-only memory (ROM), a random access memory (RAM), an optical storage, a magnetic storage such as a disc or a tape, a non-volatile memory card, a logical storage spanning multiple physical servers (i.e., a "cloud storage"), a combination thereof, or any other digital storage. The memory stores data and program instructions that are used by the CPU. In other implementations, the processing of the computing device may be distributed among one or more devices communicating over one or more networks.

Further, in one implementation, for example, computing device can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein. Computing device can be implemented on a device separate from the server, such as a cell phone or other hand-held communications device.

Further, all or a portion of implementations of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

What is claimed is:

1. A method, comprising:

receiving, by a processor, a first device identifier from a first computing device;

establishing, by the processor, a connection between the first computing device and a second computing device when a distance between the first computing device and the second computing device is within a predetermined range for a predetermined time period;

determining, by the processor, whether the first device identifier matches a second device identifier stored in a database at the second computing device, wherein the database stores a set of device identifiers, a set of user data, and corresponding relationships between the set of device identifiers and the set of user data;

locating, by the processor, first user data associated with the first device identifier in the database of the second computing device based on the determination that the first device identifier matches the second device identifier stored in the database;

transmitting, by the processor, the first user data to the first computing device based on a location of the first user data associated with the first device identifier in the database of the second computing device;

selecting, by the processor, an application to automatically launch on the first computing device based on application information within the first user data and based on whether the first computing device has a stable power supply;

updating, by the processor, a user data list with the first user data, wherein the user data list is associated with the application and is stored at the second computing device;

determining, by the processor, second user data from the user data list; and launching, by the processor, the application on the first computing device, wherein the application uses the second user data.

2. The method of claim 1, further comprising:

determining, by the processor, the distance between the first computing device and the second computing device;

authorizing, by the processor, the first computing device to access a wireless network associated with the second computing device.

3. The method of claim 1, further comprising:

based upon a determination that the first device identifier does not match any one of the set of device identifiers stored in the database, appending the first device identifier to the database and configuring the first computing device for access to a wireless network associated with the second computing device.

4. The method of claim 3, wherein the configuring the first computing device for access to the wireless network comprises:

in accordance with an automatic configuration of the second computing device or a request by the first computing device, determining, by the processor, parameters for the first computing device for access to the wireless network based upon network configuration data, wherein the network configuration data includes at least one of: a MAC address, an IP address, a channel measurement, power data, or battery data.

5. The method of claim 1, wherein the determining whether the first device identifier matches the second device identifier stored in the database at the second computing device comprises:

in accordance with one or more predetermined rules, determining, by the processor, whether the first computing device and a user associated with the first computing device have secure identity data, wherein the secure identity data and the first device identifier are not the same; and based upon a determination that the first computing device and the user associated with the first computing device have secure identity data, determining whether the first device identifier matches the second device identifier stored in the database of the second computing device.

6. The method of claim 1, wherein the launching an application in the first computing device comprises:

enabling, by the processor, an automatic login service of the application for mobile communication, wherein the automatic login service uses the first user data transmitted by the processor.

7. The method of claim 1, wherein the launching the application in the first computing device comprises at least one of:

enabling, by the processor, a login service of the application using the second user data;

based upon a determination, by the processor, that the second user data does not match the first user data, receiving the second user data from the first computing device at the second computing device, wherein the received second user data comprises a username, a password, a name of the application, a version number of the application, a recent login time stamp associated with the username and the password, or a recent logout time stamp associated with the username and the password; and updating, by the processor, user data associated with the first device identifier in the database of the second computing device with the received second user data.

8. A method, comprising:

receiving, by a processor, a first device identifier from a first computing device in response to a determination that a distance between the first computing device and a second computing device is within a predetermined range for a predetermined time period;

determining, by the processor, whether the first device identifier matches a second device identifier stored in a database at the second computing device, wherein the database stores a set of device identifiers, a set of user data, and corresponding relationships between the set of device identifiers and the set of user data;

locating, by the processor, first user data associated with the first device identifier in the database of the second computing device based on the determination that the first device identifier matches the second device identifier stored in the database;

transmitting, by the processor, the first user data to the first computing device based on a location of the first user data associated with the first device identifier in the database of the second computing device;

selecting, by the processor, an application to automatically launch on the first computing device based on application information within the first user data;

updating, by the processor, a user data list with the first user data, wherein the user data list is associated with the application and is stored at the second computing device;

determining, by the processor, second user data from the user data list; and launching, by the processor, the application on the first computing device, wherein the application uses the second user data.

9. The method of claim 8, wherein the application to automatically launch on the first computing device comprises one of: an application for configuring the first computing device, an application for service of documents, pictures, audio or video, an application for location based services, and an application for backing up data to a cloud server.

10. The method of claim 8, wherein the application to automatically launch on the first computing device comprises one of: an application for data communication, a social network application, a document uploading application, a cloud drive application, and an application to complete a business transaction using stored payment information.

11. The method of claim 8, wherein the first computing device comprises a mobile device and the second computing device comprises a wireless router.

12. The method of claim 8, wherein the determining whether the first device identifier matches the second device identifier stored in the database at the second computing device comprises:

in accordance with one or more predetermined rules, determining, by the processor, whether the first computing device and a user associated with the first computing device have secure identity data, wherein the secure identity data and the first device identifier are not the same; and based upon a determination that the first computing device and the user associated with the first computing device have secure identity data, determining whether the first device identifier matches the second device identifier stored in the database of the second computing device.

13. The method of claim 8, wherein the launching an application in the first computing device comprises:
enabling, by the processor, an automatic login service of the application for mobile communication, wherein the automatic login service uses the first user data transmitted by the processor.

14. The method of claim 8, wherein the launching the application in the first computing device comprises at least one of:
enabling, by the processor, a login service of the application using the second user data;
based upon a determination, by the processor, that the second user data does not match the first user data, receiving the second user data from the first computing device at the second computing device, wherein the received second user data comprises a username, a password, a name of the application, a version number of the application, a recent login time stamp associated with the username and the password, or a recent logout time stamp associated with the username and the password; and
updating, by the processor, user data associated with the first device identifier in the database of the second computing device with the received second user data.

15. An apparatus, comprising:
a memory; and
a processor configured to execute instructions stored in the memory to:
receive a first device identifier from a first computing device;
establish a connection between the first computing device and a second computing device when a distance between the first computing device and the second computing device is within a predetermined range for a predetermined time period;
determine whether the first device identifier matches a second device identifier stored in a database at the second computing device, wherein the database stores a set of device identifiers, a set of user data, and corresponding relationships between the set of device identifiers and the set of user data;
locate first user data associated with the first device identifier in the database of the second computing device based on a determination that the first device identifier matches the second device identifier stored in the database;
transmit the first user data to the first computing device based on a location of the first user data associated with the first device identifier in the database of the second computing device;
select an application to automatically launch on the first computing device based on application information within the first user data;
update a user data list with the first user data, wherein the user data list is associated with the application and is stored at the second computing device;
determine second user data from the user data list; and
launch the application on the first computing device, wherein the application uses the second user data.

16. The apparatus of claim 15, wherein the instructions stored in the memory further comprise instructions to:
determine the distance between the first computing device and the second computing device;
authorize the first computing device to access a wireless network associated with the second computing device.

17. The apparatus of claim 16, wherein the instructions stored in the memory further comprise instructions to:
establish a connection between the first computing device and a third computing device when a distance between the first computing device and the third computing device is within the predetermined range for the predetermined time period; and
authorize the first computing device to access the wireless network associated with the second computing device via the third computing device.

18. The apparatus of claim 17, wherein the first computing device comprises a mobile device, the second computing device comprises a first wireless router, and the third computing device comprises a second wireless router.

19. The apparatus of claim 17, wherein the instructions stored in the memory further comprise instructions to:
set, without manual configuration, the third computing device to a repeater work mode based on a determination that the third computing device has no wired network connection.

20. The apparatus of claim 19, wherein the first computing device is authorized to access the wireless network associated with the second computing device via the third computing device when the third computing device is in the repeater work mode and the first computing device has been previously authorized by the second computing device to access the wireless network associated with the second computing device.

* * * * *